T. S. MILLER.
COLLIER AND COAL HANDLING APPARATUS.
APPLICATION FILED DEC. 26, 1903.
943,694.
Patented Dec. 21, 1909.
8 SHEETS—SHEET 1.
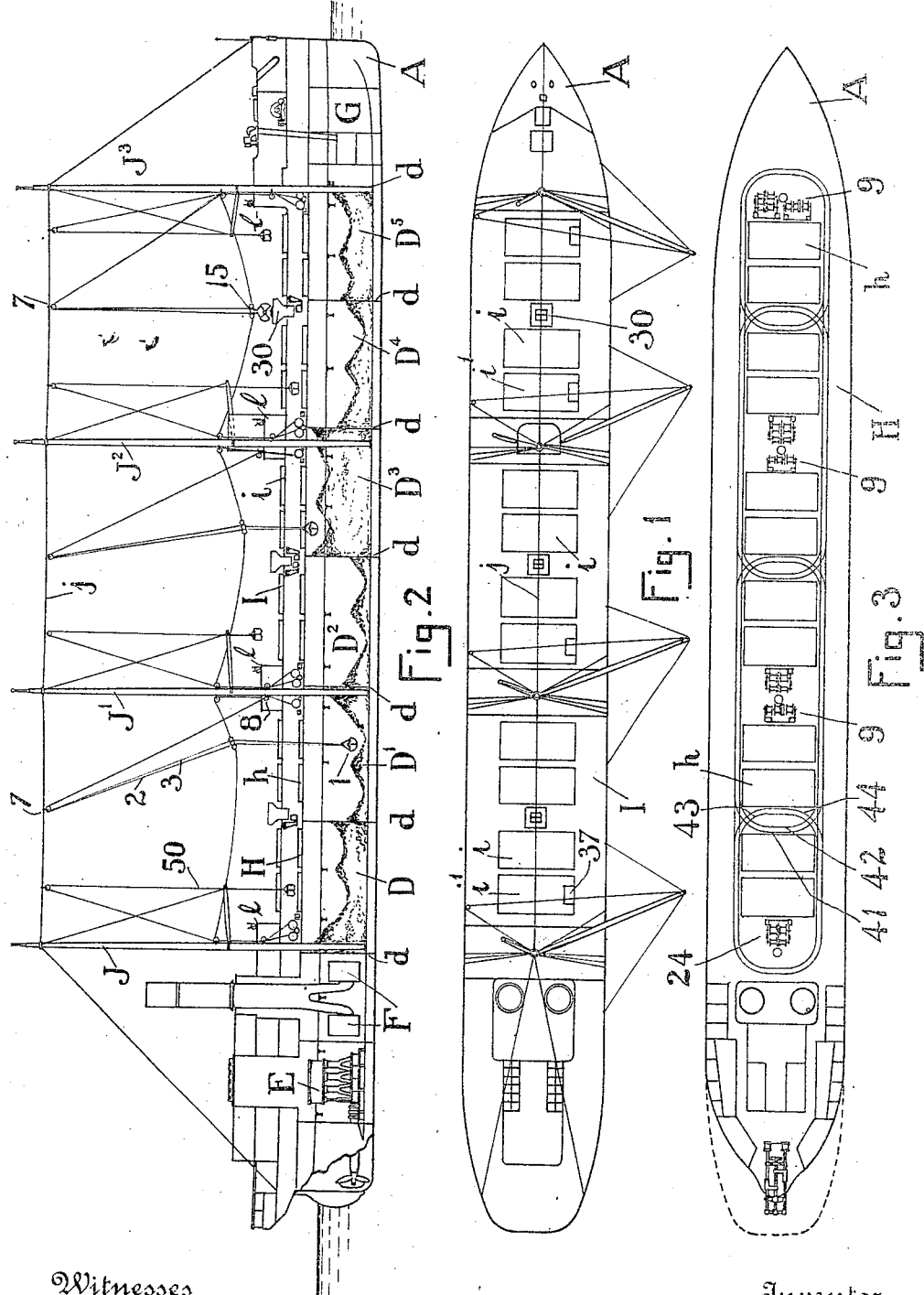

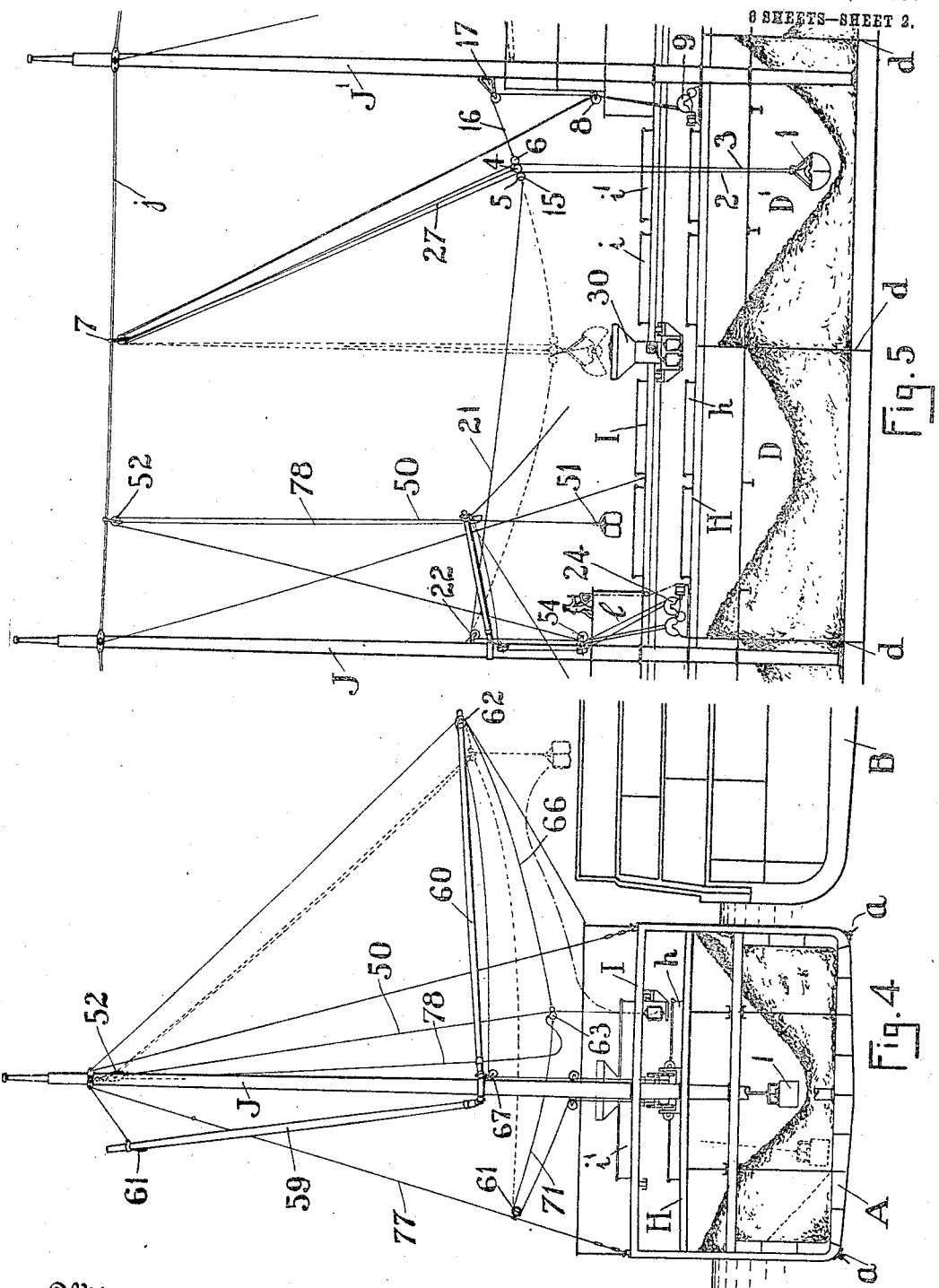

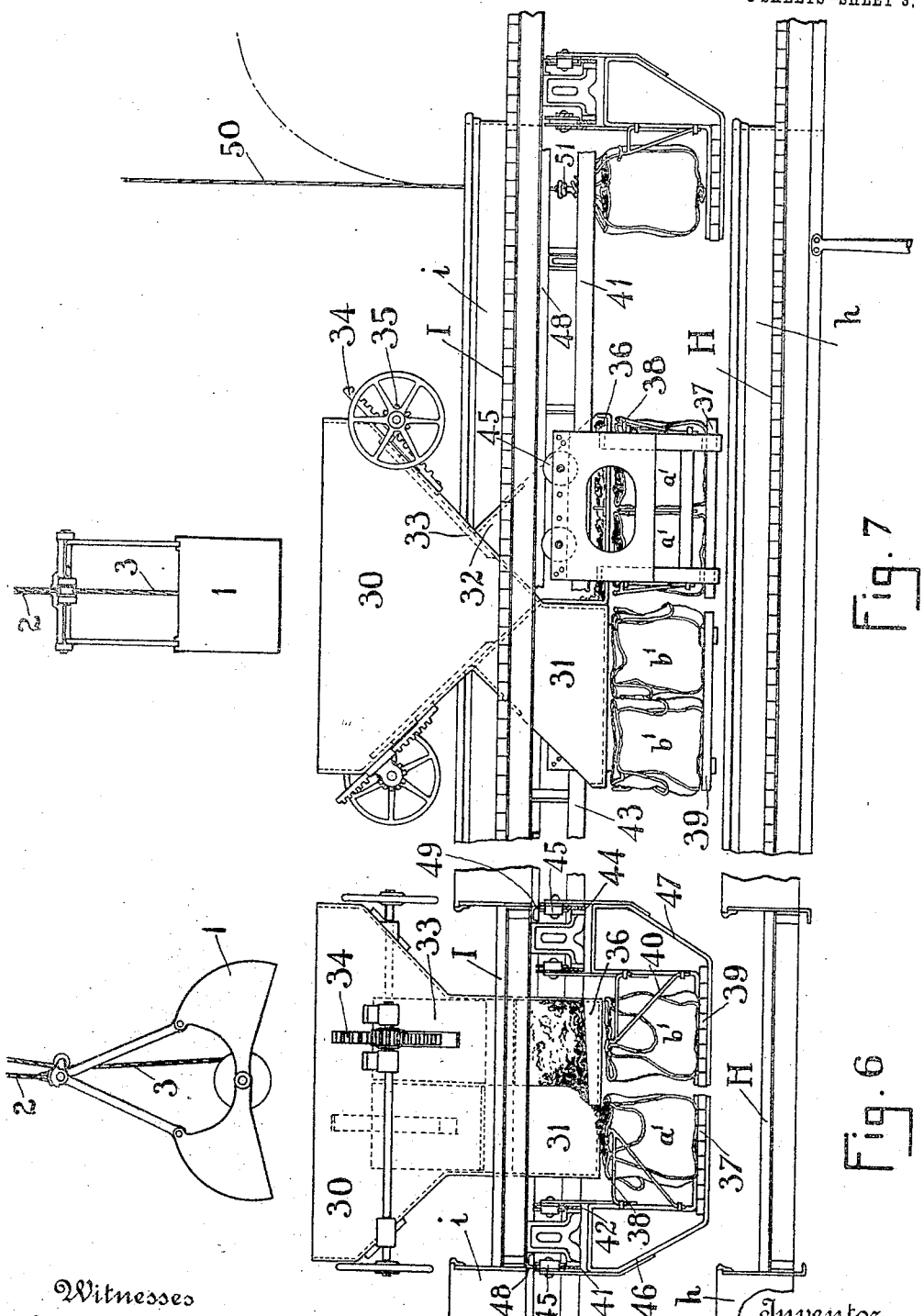

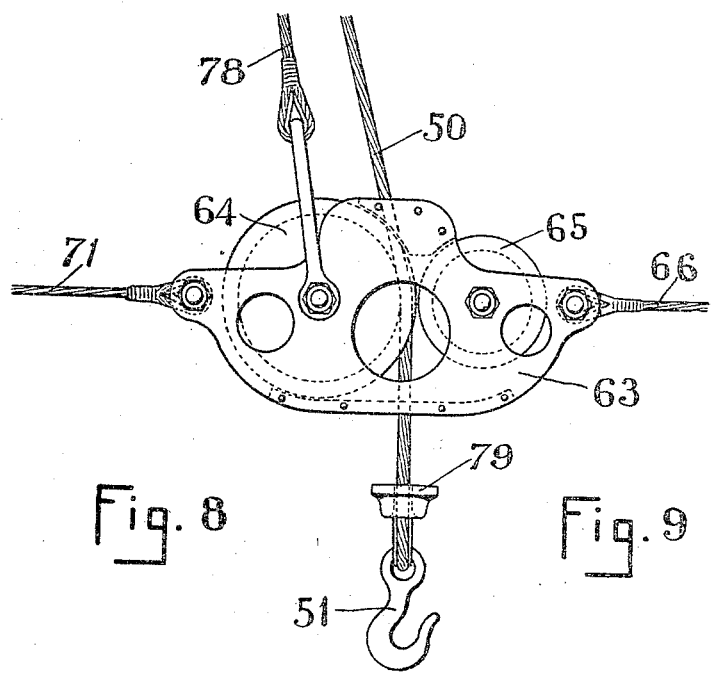
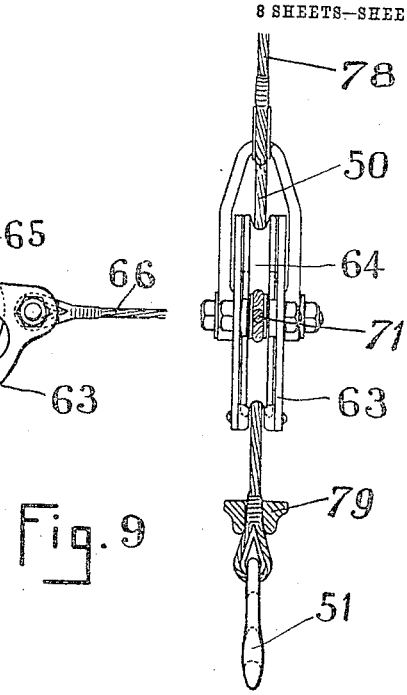
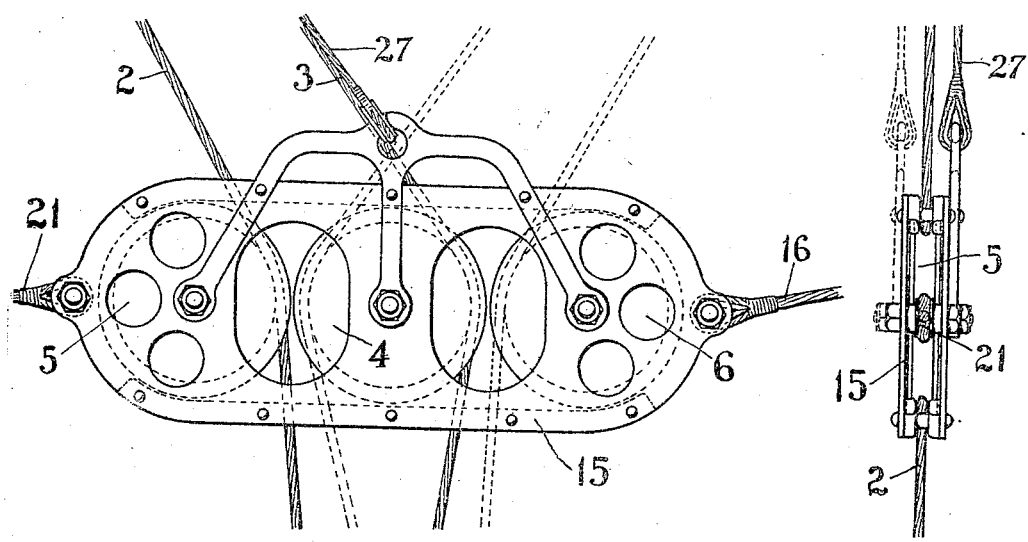

T. S. MILLER.
COLLIER AND COAL HANDLING APPARATUS.
APPLICATION FILED DEC. 26, 1903.
943,694.
Patented Dec. 21, 1909.
8 SHEETS—SHEET 5.
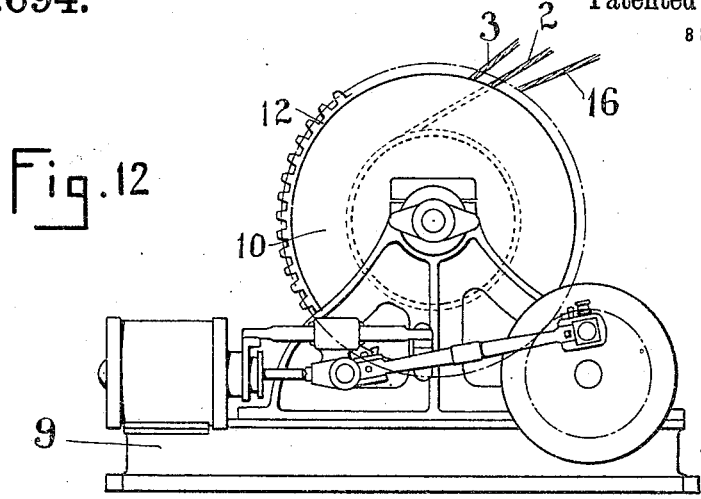
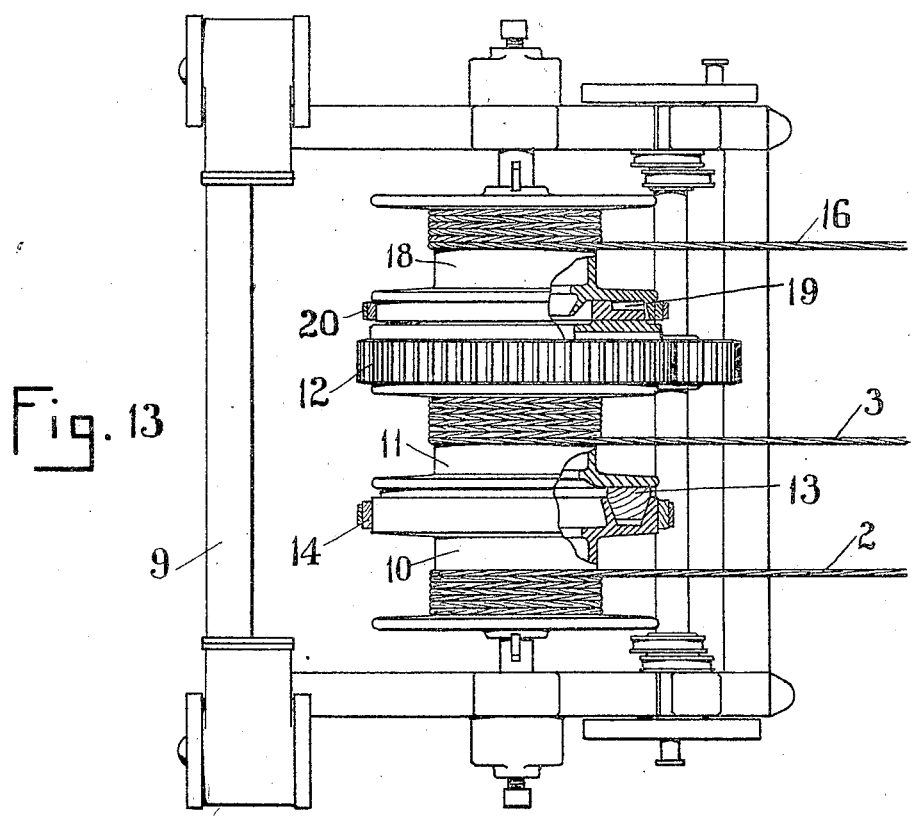
Witnesses
Richard W. Seabury.
Walter A. Pauling.
Inventor
Thomas Spencer Miller
By his Attorneys
Gifford & Bull.

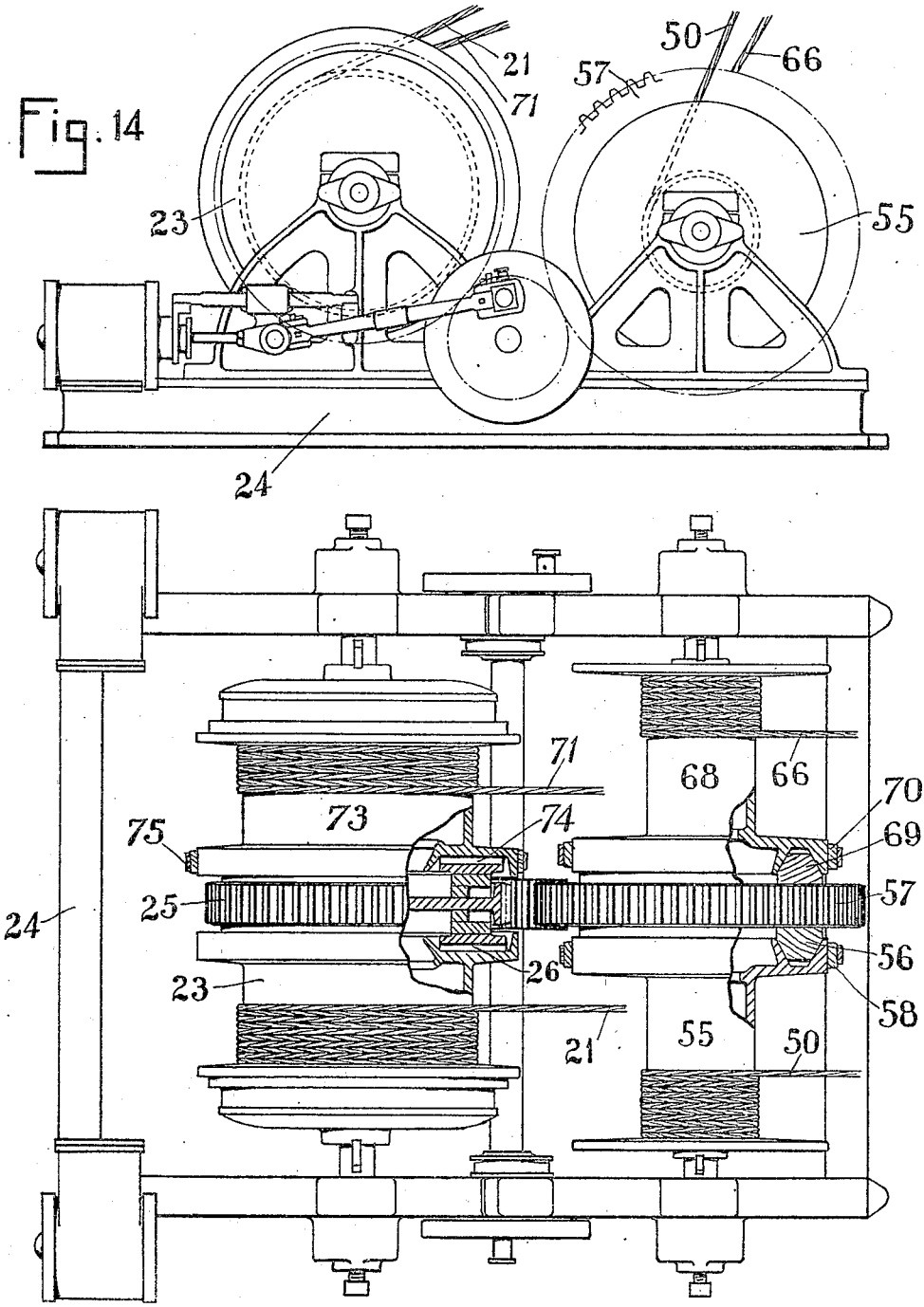

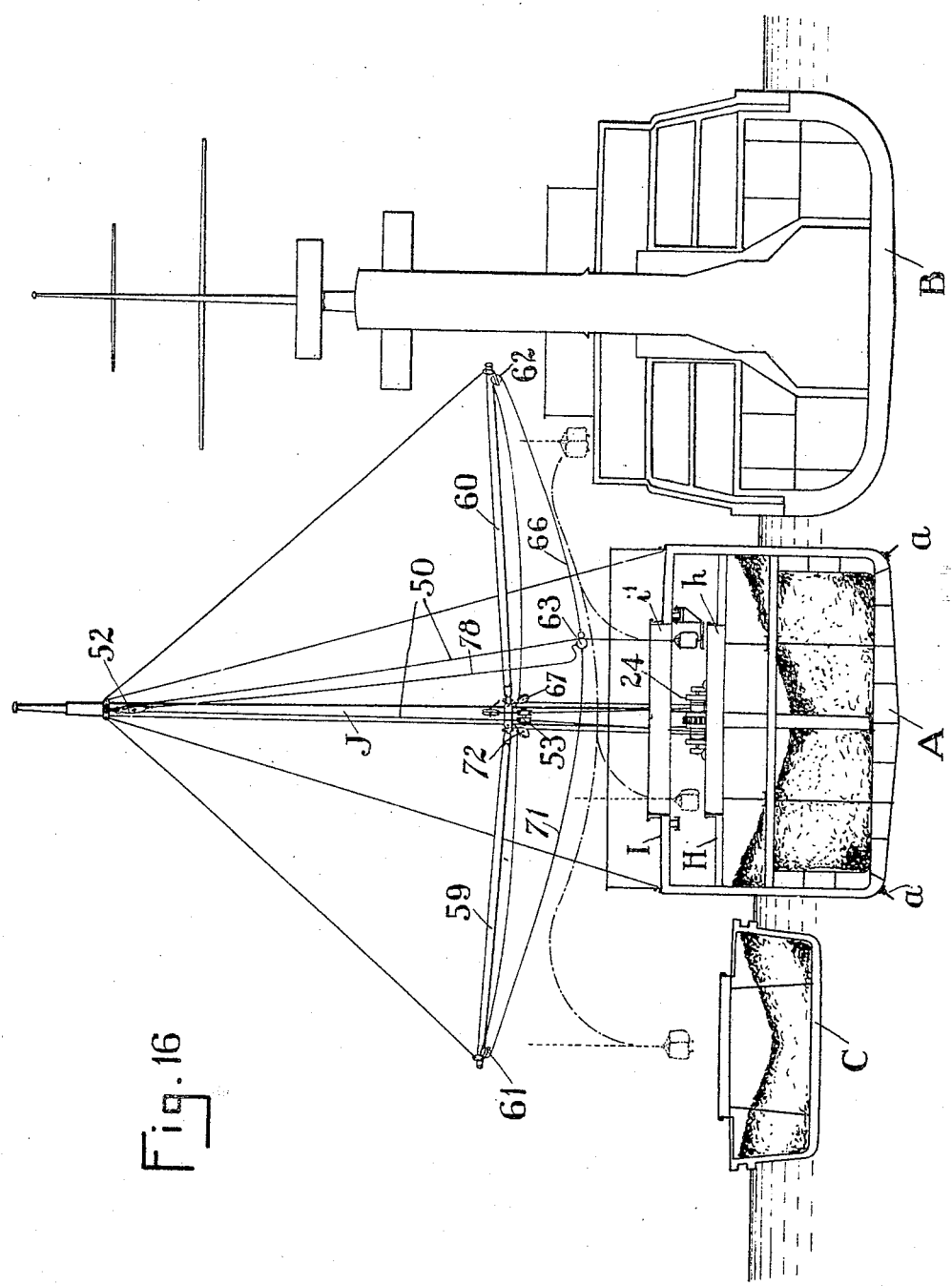

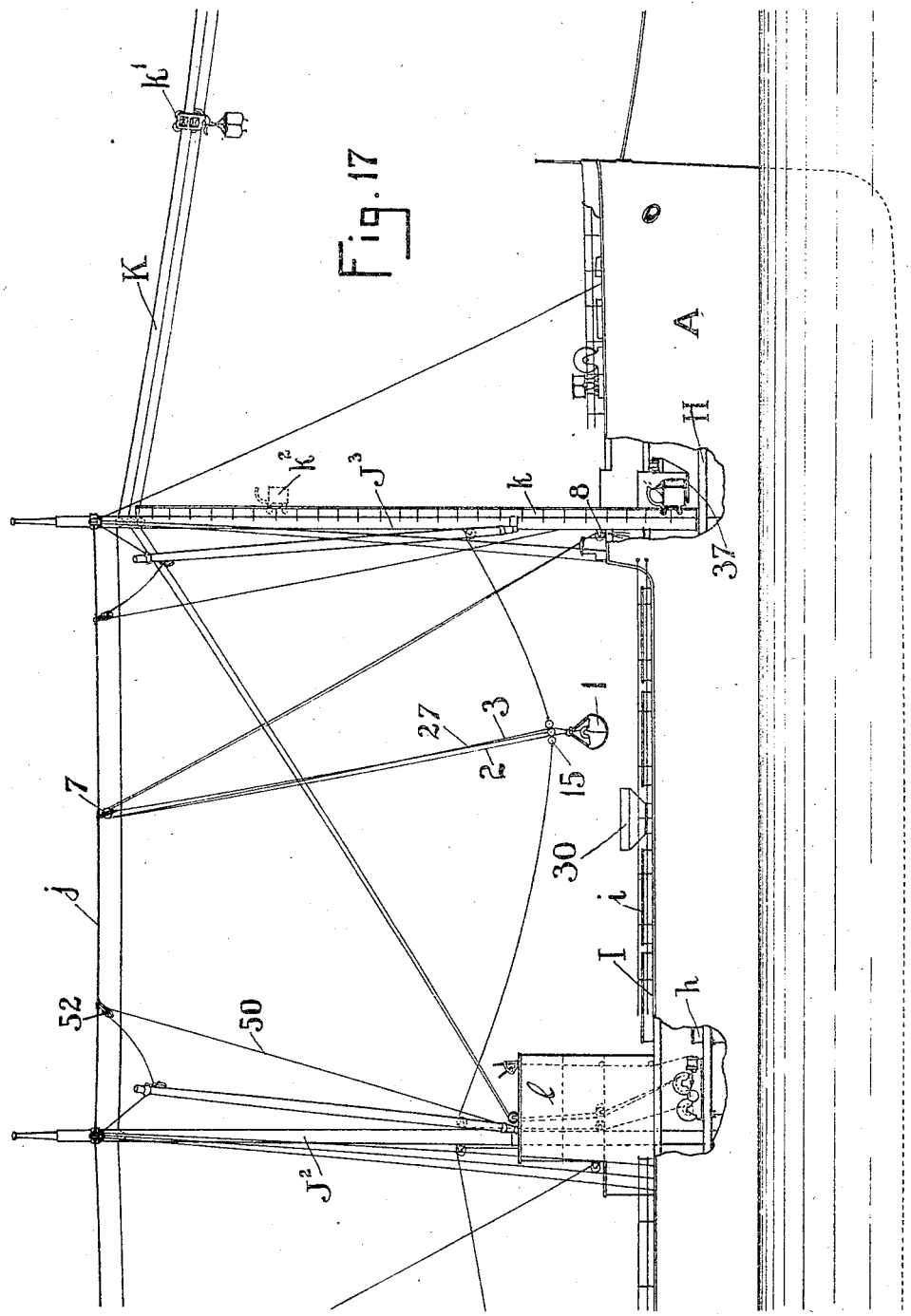

UNITED STATES PATENT OFFICE.

THOMAS SPENCER MILLER, OF SOUTH ORANGE, NEW JERSEY.

COLLIER AND COAL-HANDLING APPARATUS.

943,694.   Specification of Letters Patent.   Patented Dec. 21, 1909.

Application filed December 26, 1903. Serial No. 186,552.

*To all whom it may concern:*

Be it known that I, THOMAS SPENCER MILLER, a citizen of the United States, and a resident of South Orange, county of Essex, and State of New Jersey, have invented a new and useful Improvement in Colliers and Coal-Handling Apparatus, of which the following is a specification.

In the accompanying drawings, Figure 1 is a plan view of a collier containing my invention. Fig. 2 is a vertical longitudinal section of the same. Fig. 3 is a detail showing in plan view the trackways and winches between decks. Fig. 4 is a vertical cross section. Fig. 5 is a longitudinal section of two compartments. Figs. 6 to 15, inclusive, are details. Fig. 16 is a modification in cross section. Fig. 17 is a side elevation of the forward half of the collier with a coaling at sea ropeway like that shown in my Patents Nos. 637143 and 691911.

A is the collier and B, the war ship alongside taking coal therefrom.

C is a barge which, in Fig. 16, is taking or delivering coal alongside of the collier. The hull of the collier is subdivided amidships into the coal compartments D, $D'$, $D^2$, $D^3$, $D^4$, $D^5$, each of which extends athwart ships and which are separated from each other and from the balance of the hold by the water tight partitions $d$.

E and F are the engine and boiler for propelling the ship, both of which are located in a compartment aft. The compartment G in the bow accommodates the crew and their appliances.

H is the main deck containing the hatches $h$ and I the shelter deck containing the hatches $i$. The hull has a broad beam and is provided with the bilge keels $a\ a$ for steadiness. This construction of the hull divides the cargo of coal into separate compartments which are located amidships and each of which extends across the vessel so that any compartment may be filled with water with the least effect upon the stability or buoyancy of the vessel. Since the partitions between these compartments are permanent and not apertured below the main deck the confinement of the water to any particular one or more of them can be depended upon under all conditions; the apparatus hereinafter described for unloading being of such a character that the integrity of the partitions is not interfered with.

The masts of the collier J, $J'$, $J^2$ and $J^3$ are preferably vertical and are preferably located with a pair of compartments between every two. They are also extraordinarily high, extending to an elevation of say one hundred feet above deck in a ship designed for carrying eight to ten thousand tons of coal; being, therefore, much higher than the navigation of such a steamship requires.

$j$ is a cable or stay extending between the masts and secured near the top of each of the masts. The elevation of this stay afforded by the extraordinary height of the masts is important for giving a sufficiently elevated support for the sheaves which form part of the hoisting appliances. A separate hoisting appliance is preferably provided for each pair of coal compartments which may be described as follows; a description of one answering for a description of all.

1 is a clam-shell bucket. 2 and 3 are the ropes by which it is suspended, hoisted, opened and closed and which extend from the bucket upward between the guide-sheaves 4, 5 and 6 over the sheaves within the block 7 fixed to the cable $j$ at a point vertically above the hopper. Thence said ropes extend downwardly around the guide-sheaves at 8 to the rope-drum engine 9 where the ropes 2 and 3 are respectively coiled upon the rope-drums 10 and 11. The drum 11 operates the rope whereby the clam-shell bucket is closed and hoisted and is fast to the spur wheel 12, which may be driven in either direction by the engine. The drum 10 operates the rope 2 whereby the clam-shell bucket is held so as to be opened for dumping by the lowering of the rope 3. The drum 10 is driven from the drum 11 by an interposed friction clutch 13 and is also provided with a friction band-brake 14.

When the bucket has been hoisted to a sufficient height its movement from above the loading position to above the discharging position is accomplished by a swinging or pendulum movement. To this end, the guide sheaves 4, 5 and 6 are mounted upon a swinging frame 15, shown in Figs. 10 and 11, which is a rope-supported and operated frame. 16 is a rope fixed to one end of said swinging frame and extending over the sheave 17 secured to the mast $J'$ and thence to the drum 18 of engine 9. Said drum 18 is operated from the spur wheel 12 through the interposed friction member 19 and is also controlled by the friction band-brake 20.

21 is a rope fixed to the opposite end of the swinging frame 15 and extending over the sheave 22 on the mast J and down to the rope-drum 23 of the engine 24, shown in Figs. 14 and 15. The drum 23 is driven from the continuously running spur wheel 25 through the interposed friction plate 26, which is of such character as to permit, at certain stages of the operation, of sufficient slipping to hold the rope 21 under tension.

While the bucket 1 is being loaded and hoisted by the operation of the drum 11, the drum 18 is held stationary by a brake 20 and the drum 23 exercises a constant tension upon the rope 21. As soon as the bucket is raised to the desired height, the engine 9 is stopped, the brake 20 of the drum 18 is relaxed permitting the frame 15 to swing from the position shown in full lines to that shown in dotted lines in Fig. 5. The drum 23 in the meantime, by reason of its constant tension upon the rope 21, promptly takes up that rope and insures that the frame 15 completes its swinging movement with promptness. The constant tension upon the rope 21 also tends, at all stages of the operation, to steady the frame 15 against undesired movements.

For the vertical support of the frame 15 (which may be of considerable weight in order to accommodate sheaves of sufficient size to prevent the undue wearing of the ropes) the following additional means may be employed: 27 is a rope fixed at its lower end to the top of the frame 15 and at its upper end to the block 7, so as to carry the weight of the frame 15 at all parts of its swinging movement. However, if desired, the rope 27 may be relieved of this weight by hoisting the bucket sufficiently so that it contacts with and raises the frame 15 so as to slack the rope 27. A collision between the bucket and the swinging frame, due either to carelessness or intention, produces no disaster because the rope support of the frame permits the bucket to push it upward.

The bagging or trolley-loading mechanism is shown in detail in Figs. 6 and 7. It consists of a hopper 30 located vertically beneath each block 7 and above the partition d between each compartment so as to be in position to receive the coal dumped from the bucket 1 when its ropes have swung into approximately vertical position. The outlet from the hopper connects with the two delivery boxes 31 and 32 arranged in athwart ship position. The outlet to each of these boxes is controlled by one of the slides 33 which, in turn, is controlled by the rack and pinion 34, 35. By the movement of the slides 33 the contents of the hopper 30 may be deflected at will into either or both delivery box 31 or 32. 36 is a partial bottom to the box 32 extending from one side a little more than half across the same. A corresponding partial bottom extends from the opposite side of the box 31 a little more than half way across the same. The two bags a' a' resting upon the platform 37 are held open by brackets 38 beneath the opening in the floor of the box 32. The two bags b' b' resting upon the platform 39 are held open by the brackets 40 beneath the opening through the floor of the box 31. The coal which falls into the delivery box 32 either passes directly through the opening in its bottom into the bags a' a' or rests temporarily on the partial floor 36 until raked off of it into the bags by the attendant. The coal takes a corresponding course through the delivery box 31 into the bags b' b'. In this manner, the coal from the hopper 30 is divided into four parts and loaded into four bags which are of adequate size to hold the capacity of the bucket 1.

The trolley mechanism is as follows: 41 and 42, 43 and 44 are the rails of two trackways extending athwart ship overhead between decks on opposite sides of the delivery boxes 31, 32. Each of these trackways is continued around the side of the hatchways, as indicated in Fig. 3. Trolley wheels 45 on these trackways suspend the frames 46 and 47 from the adjacent side of which the platforms 37 and 39 extend inversely so that each platform underlies a portion of a hatchway. The rail 48 overlies the trolley wheels running on the rail 41 and the rail 49 overlies the trolley wheel running on the rail 44. By the arrangement above described, the bags are transported on the trolley platforms 37 and 39 from the loading position beneath the hoppers to any hatchway of the vessel through which the apparatus operates for the delivery of the bag; said hatchways being designated as i'' in the drawings in which four bag-delivery apparatuses are shown, a description of one of which will answer for all.

The bag-delivery apparatus consists of a hoisting rope 50 suspending a hook 51 and extending over the sheave of block 52 secured to the elevated mast-head stay j; thence downward around the guides 53 and 54 to the rope-drum 55 of the engine 24 driven by the friction clutch 56 fast to the driven spur wheel 57. The drum 55 is further controlled by the brake 58. 59 and 60 are booms extending outboard from each side of the mast J and carrying on their outer ends the blocks 61 and 62. 63 is a swinger frame, (shown in detail in Fig. 8), which supports the guide sheaves 64 and 65 between which the hoisting rope 50 passes. The rope 66 fast to one end of the swinger frame 63 passes thence around the sheave of block 62 and the sheave 67 to the rope-drum 68 of engine 24, which rope-drum is controlled by the friction-clutch 69 fast to spur wheel 57 and by the brake 70. 71 is a rope fast to the other end of the swinger frame 63; extends thence around the sheave of block 61 and sheave 72 to rope-drum 73 of engine 24, which rope-drum is controlled by the slipping friction 74 and the brake 75. Said slipping friction enables the drum 73 to maintain constant tension upon the ropes 71 and 66 which aids in controlling the movements of the swinger frame 63 with promptness and against undersirable vibration. When the clutch 69 is set, it overpowers the friction 74 and the swinger frame moves toward block 62; but when the friction clutch 69 is unset, it permits the friction 74 to move the swinger frame toward the block 61. In this way, the hoisting rope 50 may be swung outboard at the adjacent side of the ship or across the ship and outboard on the opposite side carrying the bags through either of the courses indicated by broken lines in Fig. 16. Or, as shown in Fig. 4, the block 61 may be secured to one of the shrouds 77 which admits of the bags being carried outboard only on one side of the vessel. 78 is a rope fixed at one end to the swinger frame 63 and at the opposite end to the block 52 and which serves to relieve the ropes 66 and 71 from the weight of the swinger frame 63. When the bags are raised, the stop or guard 79 striking against the bottom of frame 63 may raise the same so as to slacken the rope 78, as shown in Figs. 4 and 16, thereby imposing the weight of the swinger block, as well as of the bags, on the hoisting rope.

It will be observed that each of the booms is set at an angle with the plane in which the fall 50 of the fall-rope swings. In this way, the fall has a clear open space within which to swing from the extremity of the boom 60 toward the block 61. It will also be observed that the rope 78 which may be conveniently referred to as a pendulum rope, is sufficiently long so that the swinger-block 63 swings in a course substantially below the level of the booms. I also prefer that the pendulum rope 78 should extend to a sufficiently elevated support so that said rope is longer than the length of the boom, as shown, having found that thereby the load can be handled most conveniently. It will also be observed that the elevation of the hoisting rope sheave above the deck H is more than three times the depth of the hold and that its elevation above the deck I is more than twice the depth of the hold. It will also be observed that the partitions d of the hull are so located that the fall rope sheave 52 is above approximately the middle of a compartment between two of said partitions and that the booms 59 and 60 starting from approximately above the partition at one end of the compartment extend outboard of said compartment on opposite sides to meet the swinger ropes 66 and 71 extending across above said compartment.

When all of the above features for controlling the movements of the fall 50 are attended to, an exceedingly simple and easy-to-be-stowed-away apparatus is provided which when employed on shipboard need not interfere with the navigation of the ship and which will handle the load with the greatest possible precision, facility and throughout a clear open space free from all obstructions.

The operation of the whole apparatus may be described as follows: When the collier is being navigated, if any of the coal compartments should be punctured the permanent divisions d will prevent the flooding of it from affecting the other portions of the ship. When the collier is delivering coal to a war ship or other receptacle alongside, as in the still waters of a harbor, the full apparatus, shown in Figs. 1 to 15, will preferably be employed. In this case, the coal is hoisted and conveyed by the series of buckets 1 from the series of coal compartments to the series of hoppers 30, by each of which hoppers it is delivered through the shelter deck into four bags between decks, two on each trolley car. The two trolley cars from each hopper run to separate delivery hatches, but at each delivery hatch a trolley car from two hoppers meet so that four bags are presented to each bag-delivery apparatus whereby they are hoisted from between decks and carried out-board and lowered onto the war ship. Thus, it will be seen that with the three buckets simultaneously working, as indicated in Figs. 1 and 2, twelve bags of coal will be simultaneously delivered onto the warship, and assuming that each bag contains one quarter of a ton, this represents three tons. Since it has been demonstrated that one man can only shovel about one ton per hour into bags, an output of 300 tons per hour, which is easily within the capacity of my apparatus, would require 300 shovelers, from which the enormous saving of labor in my apparatus will be realized. Moreover, the limited number in the crew of a collier could not provide so great a number of shovelers, who would be taken largely from the crew of the battleship and thus make the crew of the battleship shorthanded for disposing of the bags of coal as fast as delivered onto the war ship. Therefore, under ordinary conditions, my apparatus supplies a substitute for labor, permitting the coaling of a ship with maximum rapidity.

In case of coaling at sea, I substitute in place of the above described bag-delivery apparatus, a single coaling-at-sea cableway, as shown at K, (Fig. 17) the preferable construction of which is described in my patent No. 691,911, and provided with an elevator $k$ adapted to hoist the bags from the trolley platform 37, shown at the bottom of the elevator, to the level of the coaling-at-sea cableway there to be received by the carriage $k'$ from the elevator car $k^2$. In this case, the trolley track runs from each of the various hatchways to the foot of the elevator. By this combination of the hoisting and trolley apparatus on the collier with the coaling-at-sea cableway, the full capacity of the coaling-at-sea cableway may be made available because not impeded by the slowness in supply of bagged coal on the collier which has heretofore been one of the most serious causes of delay.

Although I have, in the foregoing specification, described a complete equipment for the continuous handling of the coal all the way from the hold of the collier to its delivery in bags on another ship, I do not wish to limit myself to the use of the whole apparatus, since I am aware that my invention embodies many different parts which are capable of several as well as joint use, and each and all of which I intend to claim.

I have used the term "bags" in a broad sense; any receptacle may be used in place of bags.

The operator for each engine stands on a bridge, such as $l$ in full view of the load while above deck.

Having thus described my invention, I claim as new and desire to secure by Letters Patent:—

1. In a boat, in combination, two masts, a line between the tops thereof, a hoisting-rope-sheave secured to said line, a hoisting-rope and a guide whereby said hoisting-rope is swung toward one of said masts.

2. In a boat, in combination, two masts, a pair of compartments in the hull between said masts, a line between the tops of said masts, a hoisting-rope-sheave secured to said line, a hoisting-rope, a receiver above the partition between said compartments and a fore and aft moving guide whereby said hoisting-rope may be swung from said receiver over either of said compartments.

3. In a boat, in combination, two masts, a line between the tops thereof, a hoisting-rope, a hoisting-rope-sheave secured to said line, a swinger guide whereby said hoisting-rope is swung toward one of said masts, ropes extending from said guide toward each mast and an actuator for said rope.

4. In a boat, in combination, the deck containing hatchways, a hoisting-engine located on the deck between two hatchways, an elevated hoisting-rope-sheave, a delivery apparatus between other hatchways and a fore and aft moving swinger guide whereby said hoisting-rope is swung between the hatchways and the delivery apparatus.

5. In a boat, in combination, a hoisting and conveying apparatus extending from the hold above the deck and thence horizontally, a hopper at the delivery point of said apparatus extending between decks and delivering into bags, and a bag-carrying-trolley between decks.

6. In a boat, in combination, a series of transverse partitions dividing the hold into compartments extending from side to side, a hoisting and conveying apparatus extending from a compartment above deck, and a trolley beside the hatchway on deck whereby the cargo from said compartments is carried from the delivery point of said hoisting apparatus to another part of said boat.

7. In a boat, in combination, a hoisting apparatus from the hold on deck, a hopper through which said hoisting apparatus delivers through deck, a trolley between decks and a delivery apparatus off deck.

8. In a boat, in combination, a self-loading bucket, an apparatus whereby it is hoisted from the hold on deck, an apparatus whereby its load is distributed into bags, means whereby said bags are transferred to another part of the boat and an apparatus whereby the bags are delivered off deck.

9. In a boat, in combination, a hoisting apparatus from the hold above deck, a distributing apparatus in to bags, a trolley apparatus for the bags along deck and a bag delivery apparatus off deck.

10. In a boat, in combination, a self-loading bucket, an apparatus whereby it is hoisted on deck, means whereby the load is carried along deck at one side thereof and means whereby it is delivered off deck.

11. In combination, a cableway adapted to extend between two boats, means for transporting across said cableway, a series of hoists from the hold to the deck of one of said boats, means whereby the loads from said hoists are directed into bags, and a trolley whereby said bags are conveyed to said cableway.

12. In a boat, in combination, a hoist extending above deck, a hopper extending through deck, two trackways between decks, one on each side the outlet from said hopper and cars mounted on said trackways and extending under said outlet.

13. In a boat, in combination, a hatchway, a hoist operating through said hatchway, trackways extending on both sides of said hatchway and meeting cars on said trackways and means whereby the load is divided between the cars of both trackways at said meeting point.

14. In a boat, in combination, two hatchways, trackways running from both of said hatchways to a meeting point, cars on said trackways, a hoist whereby said cars are loaded at separate hatchways and a delivery apparatus to which said cars deliver their loads at said meeting point.

15. In a boat, in combination, two hatchways, a hoist through the first hatchway, a conveyer between decks from the first to a second hatchway, and a hoist through the second hatchway.

16. In a boat, two decks containing two hatchways, a hoist through the first hatchway above deck, a passage from the delivery of the hoist through the upper deck, a conveyer between decks to the second hatchway and a hoist through the second hatchway from between decks above the upper deck.

17. In combination, two rope-drum engines, a hoisting rope extending from a drum of the first engine over an elevated sheave from which its fall is pendent, a swinger guide engaging said fall, a rope connecting said swinger guide with a drum of the first engine, and an opposed rope connecting said guide with a drum of the second engine.

18. In a boat, in combination, two rope-drum engines located on opposite sides of a hatchway, a hoisting rope extending from a drum of the first engine over an elevated sheave from which its fall is pendent through said hatchway, a swinger guide engaging said fall, a rope connecting said swinger guide with a drum of the first engine and a rope connecting said guide with a drum of the second engine.

19. In a boat, in combination, a mast, a hoisting-rope-sheave in supported relation therewith at an elevation above the ordinary boat equipment, a hoisting-rope and a fore and aft moving guide whereby said hoisting-rope is swung.

20. In a boat, in combination, two masts, a line between the same at an elevation above the ordinary boat equipment, a hoisting-rope-sheave carried by said line, a hoisting-rope and a guide whereby said hoisting-rope is swung.

21. In a boat, in combination, the partitions dividing the hold into transverse compartments, the decks H and I, means whereby the cargo is hoisted through and above said decks and lowered between the same through the deck I and means whereby it is transported between said decks.

22. In a boat, in combination, the decks H and I, means whereby the cargo is hoisted through and above said decks and lowered between the same through the deck I and means whereby it is transported between said decks.

23. In a boat, in combination, the decks H and I, means whereby the cargo is hoisted through and above said decks and lowered between the same through the deck I, means whereby it is transported between said decks and means whereby it is again hoisted through and above said deck I.

24. In a boat, in combination, a hoisting apparatus containing a dumping load receptacle, means on the boat through which the load is filled into bags, means whereby said bags are transported horizontally from one part of the boat to another and means whereby the bags are transported off the boat.

25. In a boat, in combination, a hoisting apparatus, a bagging apparatus, a bag transporting trolley and means for delivering the bags off the boat.

26. In a boat, in combination, the two decks H and I, apparatus for hoisting the cargo through and above said decks and apparatus extending through the deck I whereby it is filled into bags, a bag transporting trolley and a hoisting apparatus whereby the bags are delivered from said trolley.

27. In a boat, in combination, a plurality of hoisting and bagging apparatuses and means whereby the bags from said plurality are conveyed to the same point of delivery and means whereby they are delivered off the boat.

28. In a boat, in combination, the deck having a hatchway, a hoisting apparatus for conveying the cargo from the hold, a bagging apparatus fore or aft of the hatchway, means whereby the bags are conveyed from said bagging apparatus to one side of the boat and thence along said side and an apparatus whereby the bags are delivered off the boat.

29. In a boat, in combination, a hoisting apparatus raising the cargo from the hold, a car whereon bags are held while being filled with said cargo and transported to another part of the boat and an apparatus whereby said bags are delivered off of said boat.

30. In a boat, in combination, the two decks H and I, an apparatus hoisting the cargo from the hold, an actuator therefor between said decks, a conveyer between said decks and an apparatus delivering the same off the boat.

31. In a boat, in combination, the two decks H and I, an apparatus hoisting the cargo from the hold, a conveyer between said decks and an apparatus hoisting the cargo from said conveyer through said deck I and delivering the same off the boat.

32. In a boat, in combination, the two decks H and I, an apparatus for hoisting the cargo from the hold, an apparatus for delivering it off the boat, a conveyer between decks whereby it is carried from one apparatus to the other, the actuating mechanism for said apparatus located between said decks and the controller therefor located above said deck I.

33. In a boat, in combination, a self-loading and self-dumping apparatus for hoisting the cargo from the hold, a car holding the bag while being filled and conveying the same to another part of the boat and apparatus whereby the bag is delivered from said car off the boat.

34. In a boat, in combination, an apparatus for hoisting the cargo from the hold, a bagging apparatus, a car holding the bag while being filled and conveying the same to another part of the boat and an apparatus delivering the bag off the boat.

35. In a boat, in combination, a mast, a hoisting-rope-sheave in supported relation therewith at an elevation above the ordinary boat equipment, a hoisting rope, a swinger guide swinging the same from a position over one part of the boat to a position over another part of the same and a receptacle on the boat receiving the load from said hoisting rope.

36. In a boat, in combination, a hoisting-rope, a swinger-guide swinging the same between two positions on the boat and a receptacle on the boat to which the load is delivered by said swinging rope.

37. In a boat, in combination, the hatchway, a bagging apparatus on the boat, a hoisting rope and a swinger-guide swinging the rope between the hatchway and the bagging apparatus.

38. In a boat, in combination, the hatchway, a conveyer on the boat, a hoisting rope and a swinger-guide swinging the rope between the hatchway and the conveyer.

39. In combination with a cableway and a boat forming the head-support therefor, of the following parts mounted on said boat whereby the cargo may be transferred from the hold of said boat to said cableway, viz: an apparatus hoisting from the hold a conveyer running fore and aft at the side of the hatchway and an elevator from the terminus of said trolley to said cableway.

40. In combination with a cableway and a boat forming the head-support therefor, of the following parts mounted on said boat whereby the cargo may be transferred from the hold of said boat to said cableway, viz: an apparatus hoisting from the hold a conveyer running fore and aft and a bagging apparatus.

41. In combination with a cableway and a boat forming the head-support therefor, of the following parts mounted on said boat whereby the cargo may be transferred from the hold of said boat to said cableway, viz: an apparatus hoisting from the hold, a self-loading load-receptacle therefor, a car holding the bag while being filled and running from said hoisting apparatus toward said cableway.

42. In combination, a hoisting rope, an actuator therefor, an elevated hoisting rope sheave, a swinger-frame engaging the fall of said hoisting rope, swinger ropes connected with said swinger-frame and extending laterally from said fall in opposite directions and a pendulum rope by which said swinger-frame is suspended from a point adjacent to said elevated hoisting rope sheave.

43. In combination, a hoisting rope, an actuator therefor, an elevated hoisting rope sheave, a swinger-frame engaging the fall of said hoisting rope, swinger ropes connected with said swinger-frame and extending laterally from said fall in opposite directions and a pendulum rope by which said swinger-frame is suspended from the block of said elevated hoisting rope sheave.

44. In combination, a hoisting rope, an actuator therefor, an elevated hoisting rope sheave, a swinger-frame engaging the fall of said hoisting rope, swinger ropes connected with said swinger-frame and extending laterally from said fall in opposite directions and a pendulum rope by which said swinger-frame is suspended from an elevation and guide wheels for said hoisting rope mounted on said swinger-frame.

45. In a boat, in combination, a series of transverse partitions dividing the hull into compartments, a hoisting rope, an elevated hoisting rope sheave above a compartment, a boom extending at an angle with a partition to a point outboard from said compartment, a swinger-frame engaging the fall of the hoisting rope above said compartment said fall being capable of free movement through said swinger frame and a swinger rope extending thence to said boom.

46. In a boat, in combination, a series of transverse partitions dividing the hull into compartments, a boom extending from a point approximately over one of said partitions at an angle therewith outboard of one of said compartments, a swinger rope extending from said boom inboard over said compartment and a hoisting rope the fall of which is engaged by said swinger-rope over said compartment.

47. Machinery for handling coal etc. comprising a vertical support, oppositely disposed gaffs carried thereby, guide sheaves at the extremities of said gaffs, a horizontal traverse rope passing over said sheaves, a flying trolley supported and moved horizontally by said horizontal traverse rope, a guide sheave carried by said support above the trolley and a hoisting rope passing over said last named guide sheave and through said trolley to be moved horizontally therewith to one side or the other.

48. In combination, a boat containing a hatchway, hoisting rope sheave 52 located above said hatchway, a hoisting rope 50, a swinger frame 63 engaging the fall of said hoisting rope, sheaves 61 and 62 on opposite sides of said hatchway, said sheave 62 being outboard from the side of the boat, supports for said sheaves and a swinger rope comprising an outhaul and an inhaul extending from said swinger frame to each of said sheaves 61 and 62 and actuators for said hoisting and swinger ropes.

49. In combination, a boat containing a hatchway, a hoisting rope sheave 52 located above said hatchway at an elevation above the ordinary boat equipment, a hoisting rope 50, a swinger frame 63 engaging the fall of said hoisting rope, sheaves 61 and 62 on opposite sides of said hatchway, said sheave 62 being outboard from the side of the boat, supports for said sheaves and a swinger rope comprising an outhaul and an inhaul extending from said swinger frame to each of said sheaves 61 and 62 and actuators for said hoisting and swinger ropes.

50. In combination, a boat containing a hatchway, a hoisting rope sheave 52 located above said hatchway, a support therefor standing at one end of said hatchway, a hoisting rope 50, a swinger frame 63 engaging the fall of said hoisting rope, sheaves 61 and 62 on opposite sides of said hatchway, said sheave 62 being outboard from the side of the boat, supports for said sheaves, a swinger engine at the end of said hatchway and a swinger rope comprising an inhaul and an outhaul extending from said swinger frame transversely to said hatchway to each of said sheaves 61 and 62 and thence diagonally to said hatchway to said swinger engine.

51. In combination, a boat containing a hatchway, a hoisting rope sheave 52 located above said hatchway, a hoisting rope 50, a swinger frame 63 embracing the fall of said hoisting rope, sheaves 61 and 62 on opposite sides of said hatchway, said sheave 62 being outboard from the side of the boat and at a higher elevation than said sheave 61, supports for said sheaves, a swinger engine at the end of said hatchway and a swinger rope comprising an inhaul and outhaul extending from said swinger frame transversely to said hatchway to each of said sheaves 61 and 62 and thence diagonally to said hatchway to said swinger engine.

52. In combination, a hoisting rope, a swinger frame engaging the fall thereof, an outhaul-swinger rope, an inhaul-swinger rope and a swinger-frame-suspender rope.

53. In combination, a boat containing a hatchway, a hoisting rope suspended above said hatchway, a swinger frame 63 engaging the fall of said hoisting rope, swinger ropes comprising an outhaul 66 and an inhaul 71 extending transversely across said hatchway and outboard on one side thereof and a swinger-frame-suspender rope 78.

54. In combination, a boat containing a hatchway, a mast, a hoisting-rope-sheave offset from said mast, a hoisting rope extending into the hatchway, its actuator, two booms extending at an angle with each other to points on opposite sides of the fall of said hoisting rope, a swinger frame embracing said fall in the open space between the extremities of said booms and swinger ropes connected with said swinger frame and comprising an outhaul and an inhaul extending, respectively, to the extremities of said booms.

55. In combination, a boat containing a hatchway, a mast, a hoisting-rope-sheave offset from the mast, a hoisting rope extending into the hatchway, its actuator at one end of the hatchway, a swinger frame engaging the fall of the hoisting rope, swinger ropes comprising an outhaul 66 and an inhaul 71 extending transversely across said hatchway and outboard on one side thereof, the swinger sheaves 61 and 62 and swinger rope actuators.

56. In a boat, in combination, a series of transverse partitions dividing the hold into compartments extending from side to side, a hoisting rope, the fall of which extends into one of said compartments, a sheave therefor located above said compartment, swinger ropes comprising an inhaul and an outhaul extending transversely across said compartment and to an outboard position on one side thereof and actuators for said ropes.

In testimony whereof, I have hereunto signed my name in the presence of two subscribing witnesses.

THOMAS SPENCER MILLER.

Witnesses:
RICHARD W. SEABURY.
JOHN J. DERRICK.